United States Patent
Desclos et al.

(10) Patent No.: US 9,172,422 B2
(45) Date of Patent: Oct. 27, 2015

(54) COMMUNICATION SYSTEMS WITH ENHANCED ISOLATION PROVISION AND OPTIMIZED IMPEDANCE MATCHING

(75) Inventors: Laurent Desclos, San Diego, CA (US); Alexandre Dupuy, San Diego, CA (US)

(73) Assignee: ETHERTRONICS, INC., San Diego, CA (US)

( * ) Notice: Subject to any disclaimer, the term of this patent is extended or adjusted under 35 U.S.C. 154(b) by 278 days.

(21) Appl. No.: 13/608,883

(22) Filed: Sep. 10, 2012

(65) Prior Publication Data
US 2013/0122831 A1   May 16, 2013

Related U.S. Application Data

(63) Continuation-in-part of application No. 13/548,211, filed on Jul. 13, 2012, now Pat. No. 8,648,756, and a continuation-in-part of application No. 13/557,173, filed on Jul. 24, 2012.

(60) Provisional application No. 61/511,114, filed on Jul. 24, 2011, provisional application No. 61/532,414, filed on Sep. 8, 2011.

(51) Int. Cl.
*H01Q 7/00* (2006.01)
*H04B 1/44* (2006.01)
*H04B 1/525* (2015.01)

(52) U.S. Cl.
CPC . *H04B 1/44* (2013.01); *H04B 1/525* (2013.01)

(58) Field of Classification Search
CPC ............ H04B 1/44; H04B 1/525; H01Q 7/00; H01Q 9/0407
USPC .......................... 343/722, 747, 853, 745, 850
See application file for complete search history.

(56) References Cited

U.S. PATENT DOCUMENTS

| | | | | |
|---|---|---|---|---|
| 6,332,071 | B1 * | 12/2001 | Brandt | 455/82 |
| 6,356,536 | B1 * | 3/2002 | Repke | 370/282 |
| 2009/0289861 | A1 * | 11/2009 | Tang et al. | 343/722 |
| 2010/0215121 | A1 * | 8/2010 | Kusano | 375/316 |

* cited by examiner

*Primary Examiner* — Hoanganh Le
(74) *Attorney, Agent, or Firm* — Costal Patent Law Group, P.C.

(57) ABSTRACT

A communication system has multiple paths including one or more Tx paths for processing Tx signals and one or more Rx paths for processing Rx signals, one or more PAs coupled respectively to the one or more Tx paths for amplifying the Tx signals, one or more LNAs coupled respectively to the one or more Rx paths for amplifying the Rx signals, one or more Tx filters coupled respectively to the one or more Tx paths for filtering the Tx signals, one or more Rx filters coupled respectively to the one or more Rx paths for filtering the Rx signals, and an antenna comprising multiple feeds coupled to the multiple paths, respectively, to provide physical separation of the multiple paths from each other. Physical separation among the multiple paths and impedance matching provides isolation among the multiple paths, and relaxes rejection considerations on the filters.

34 Claims, 9 Drawing Sheets

COMMUNICATION SYSTEMS WITH ENHANCED ISOLATION PROVISION AND OPTIMIZED IMPEDANCE MATCHING

CROSS-REFERENCE TO RELATED APPLICATIONS

This application is a Continuation in Part (CIP) of commonly owned U.S. patent application Ser. No. 13/548,211, filed Jul. 13, 2012, titled "MULTI-FEED ANTENNA FOR PATH OPTIMIZATION";

a Continuation in Part (CIP) of commonly owned U.S. patent application Ser. No. 13/557,173, filed on Jul. 24, 2012, titled "MULTI-MODE MULTI-BAND SELF-REALIGNING POWER AMPLIFIER"; which claims benefit of priority to U.S. Provisional Application Ser. No. 61/511,114, filed Jul. 24, 2011; and claims benefit of priority with U.S. Provisional Application Ser. No. 61/532,414, filed Sep. 9, 2011;

the contents of each of which are hereby incorporated by reference.

BACKGROUND OF THE INVENTION

Frequency bands and modes associated with various protocols are specified per industry standards for cell phone and mobile device applications, WiFi applications, WiMax applications and other wireless communication applications, and the number of specified bands and modes is increasing as the demand pushes. Examples of the frequency bands and modes for cell phone and mobile device applications are: the cellular band (824-960 MHz) which includes two bands, CDMA (824-894 MHz) and GSM (880-960 MHz) bands; and the PCS/DCS band (1710-2170 MHz) which includes three bands, DCS (1710-1880 MHz), PCS (1850-1990 MHz) and AWS/WCDMA (1920-2170 MHz) bands. Examples for uplink for transmit (Tx) signals include the frequency ranges of DCS (1710-1785 MHz) and PCS (1850-1910 MHz). Examples for downlink for receive (Rx) signals include the frequency ranges of DCS (1805-1880 MHz) and PCS (1930-1990 MHz). Examples of frequency bands for WiFi applications include two bands: one ranging from 2.4 to 2.48 GHz, and the other ranging from 5.15 GHz to 5.835 GHz. The frequency bands for WiMax applications involve three bands: 2.3-2.4 GHz, 2.5-2.7 GHZ, and 3.5-3.8 GHz. Use of frequency bands and modes is regulated worldwide and varies from country to country. For example, for uplink, Japan uses CDMA (915-925 MHz) and South Korea uses CDMA (1750-1780 MHz). In this document, "modes" refer to WiFi, WiMax, LTE, WCDMA, CDMA, CDMA2000, GSM, DCS, PCS and so on; and "bands" or "frequency bands" refer to frequency ranges (700-900 MHz), (1.7-2 GHz), (2.4-2.6 GHz), (4.8-5 GHz), and so on. Laptops, tablets, personal digital assistants, cellular phones, smart phones and other mobile devices include a communication system which is generally designed to have paths or chains to process signals in multiple modes and bands. In this document, a combination of a mode and a band is denoted as "mode/band."

As new generations of wireless communication devices become smaller and packed with more multi-mode multi-band functions, designing new types of antennas and associated air interface circuits is becoming increasingly important. In particular, signals in different frequency bands in such a dense RF circuitry tend to interfere with each other, and in some cases even damage sensitive components if the gap between the bands is small. Therefore, a proper isolation provision needs to be considered in designing such a multi-mode multi-band system having multiple paths therein.

DETAILED DESCRIPTION

In view of the isolation considerations for a multi-mode multi-band communication system having multiple paths, this document provides implementations and examples of communication systems configured to provide an enhanced isolation provision. The system may include an antenna comprising multiple feeds coupled to the multiple paths, respectively, to provide physical separation of the multiple paths from each other. The antenna is configured to provide impedance matching for each of the multiple paths. The physical separation of the multiple paths and the impedance matching for each of the multiple paths may provide isolation among the multiple paths, and relax rejection considerations on the filters. Specific implementations and examples are described below with reference to the corresponding figures.

Figure 1:
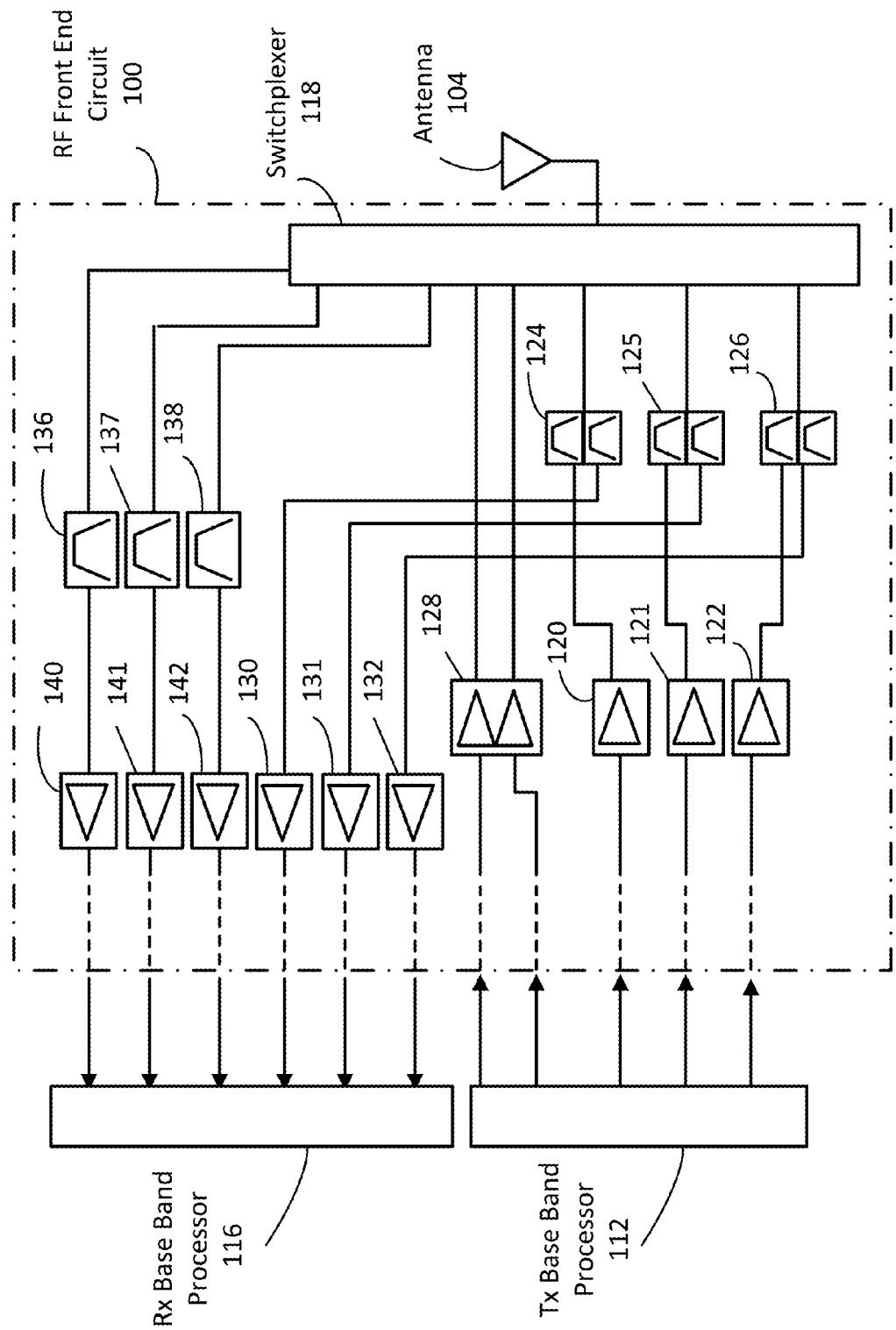
FIG. 1 illustrates an example of an architecture configured for a conventional communication system.

FIG. 1 illustrates an example of an architecture configured for a conventional communication system including an RF front end circuit 100 coupled to an antenna 104, a Tx base band processor 112 and an Rx base band processor 116. These base band processors may be fabricated on a same chip. Tx signals to be transmitted out from the antenna 104 are inputted from the Tx base band processor 112 into the RF front end circuit 100, and Rx signals received by the antenna 104 are outputted into the Rx base band processor 116 from the RF front end circuit 100. These signals are processed by various components and modules configured in the RF front end circuit 100. In this example, the Tx signals are in five mode/band combinations, e.g., DCS (1710-1785 MHz), PCS (1850-1910 MHz), etc., and are processed through respective Tx paths in the RF front end circuit 100. Also in this example, the Rx signals are in six mode/band combinations, e.g., DCS (1805-1880 MHz), PCS (1930-1990 MHz), etc., and are processed through respective Rx paths in the RF front end circuit 100. Many communication systems are designed based on a duplexing scheme such as time division duplex (TDD), frequency division duplex (FDD) or a combination of both, and may use a switch module, a diplexer or other components to separate the signals between Tx and Rx paths. This example in FIG. 1 includes a switch module such as a switchplexer 118 to switch between Tx and Rx paths as well as among paths for different mode/band combinations. Power amplifiers (PAs) are used in the Tx paths to amplify the Tx signals. Low noise amplifiers (LNAs) are used in the Rx paths to amplify the Rx signals while adding as little noise and distortion as possible to increase sensitivity and sensibility. Each PA or LNA in this example is adapted to operate for a single mode/band combination. The Tx signals having three different mode/band combinations that enter from the lower three ports of the Tx base band processor 112 are amplified by PAs 120, 121, and 122, respectively, and filtered through duplexers 124, 125, 126, respectively. On the other hand, the Rx signals in the corresponding three modes are filtered through the duplexers 124, 125 and 126, respectively, sent to LNAs 130, 131 and 132, respectively, and outputted to the lower three ports of the Rx base station processor 116, respectively. Additionally, this example in FIG. 1 shows that the PAs to amplify the Tx signals coming out of the upper two ports of the Tx base band processor 112 are integrated on a same chip 128, and that the amplified Tx signals in the two paths reach the switchplexer 118 without a duplexer. A duplexer may be omitted in some applications as in these two paths. A filter may optionally be added at the output side of the PA to reduce harmonics, for example. Also shown in the example in FIG. 1 are filters 136, 137 and 138, which are used for the Rx signals in three different mode/band combinations, respectively, and these Rx signals are sent to LNAs 140, 141 and 142, respectively, and outputted to the upper three ports of the Rx base band processor 116, respectively.

The RF front end circuit 100 may include various other components and modules, such as analog-to-digital converters, digital-to-analog converters, mixers, summers, switches, and so on for optimum processing of signals. Some of these components and modules may be integrated on a CMOS chip, providing a transceiver module. The LNAs 130, 131, 132, 140, 141 and 142 may be included in the first stage in the receiver portion of a transceiver. The LNAs 130, 131, 132, 140, 141 and 142 in the present example are configured to be single-ended; however, differential LNAs may be used to improve a noise figure based on the ability to reject common-mode noise. In general, a single-ended LNA consumes less power than a differential LNA.

As seen in the above example of a conventional architecture of FIG. 1, communication systems can generally be designed to support one or more modes and frequency bands. For each mode, a portion of the bandwidth may be used for the Tx operation and the other portion may be used for the Rx operation, separating the band into the Tx band and the Rx band. As mentioned earlier, the DCS mode has the Tx band of (1710-1785 MHz) and the Rx band of (1805-1880 MHz), splitting the original DCS band of (1710-1880 MHz); the PCS mode has the Tx band of (1850-1910 MHz) and the Rx band of (1930-1990 MHz), splitting the original PCS band of (1850-1990 MHz). A single antenna is typically used to cover both Tx and Rx bands in a conventional multi-band system. As seen in the example of FIG. 1, the RF front end circuit of such a communication system may include a switch module, a band pass filter (BPF) in the duplexer, a PA, an LNA and other components and modules. During the Tx operation, the power amplified and outputted by the PA to the antenna is much larger than the power received by the antenna in the Rx operation. Therefore, there is a possibility that sensitive components in the Rx circuitry such as LNAs may get damaged by the Tx power leak if a proper isolation scheme is not provided. In some cases, the difference in power level between the Tx and Rx signals could reach as large as 130 dBm.

Figure 2:
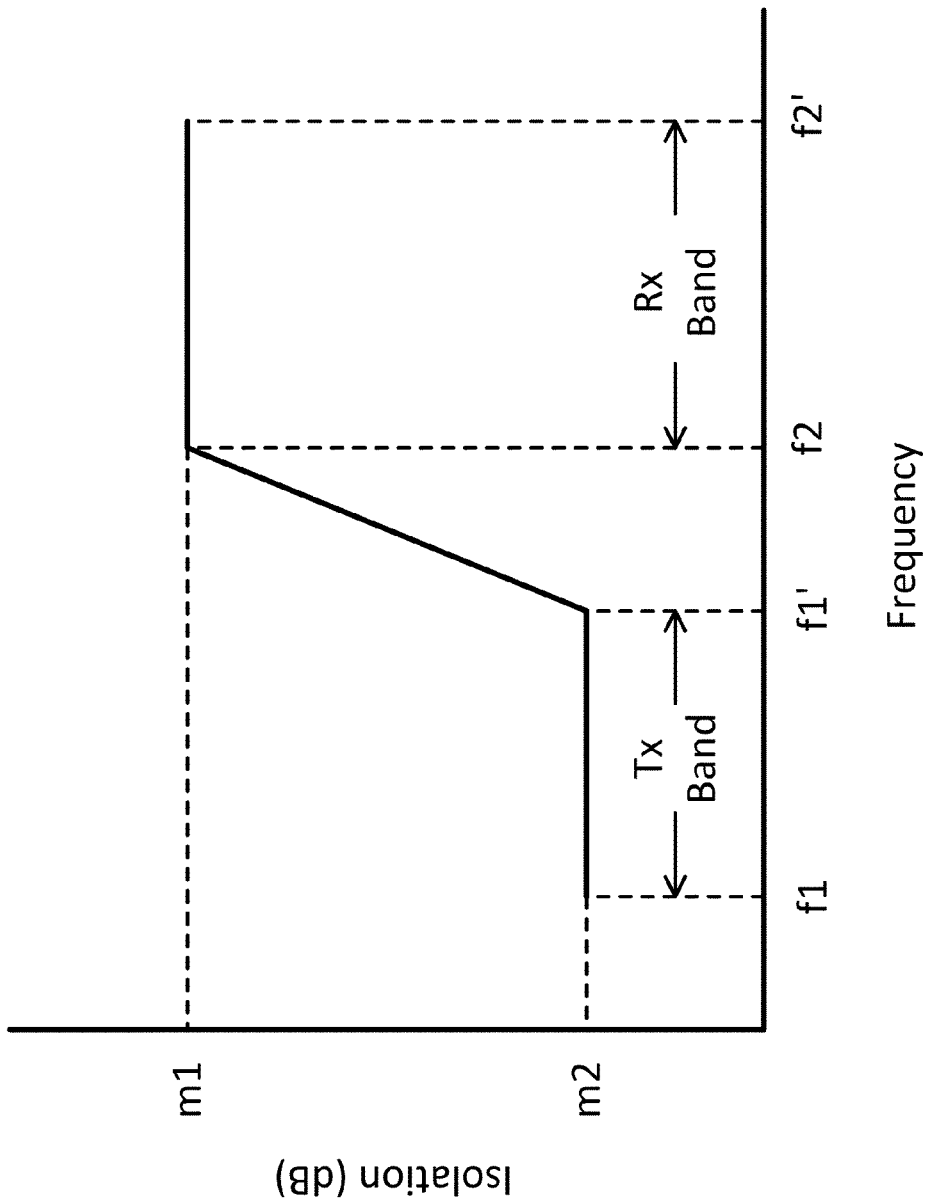
FIG. 2 is a schematic plot illustrating the isolation consideration in dB as a function of frequency with respect to an Rx path.

FIG. 2 is a schematic plot illustrating the isolation consideration in dB as a function of frequency with respect to an Rx path. The isolation consideration may be realized by a filter associated with the Rx path, whereby the plot in FIG. 2 may represent rejection characteristics of the filter. In this plot, the Tx band ranges from f1 to f1', whereas the Rx band ranges from f2 to f2'. The power leak from the Tx path to the Rx path during the Tx operation may be effectively rejected if the isolation level, indicated by the difference between m1 and m2, is sufficiently large. In some designs, the rejection of as much as 50 dB may be needed for the proper Rx protection. There are certain cases where the Tx and Rx bands are very close; for example, the PCS(1850-1910 MHz) and the PCS (1930-1990 MHz) are separated by a frequency gap (f1'-f2) of only ~20 MHz. Obtaining a high isolation level is especially difficult when the Tx and Rx frequencies are close, since fabricating a device that can provide a steep slope from m2 to m1 can be complex and expensive. A switch may be used to provide a certain level of isolation, such as the switchplexer 118 of the example in FIG. 1. However, the use of semiconductor switches for the Tx/Rx signal routing can pose cost disadvantages, for example, in some applications that require expensive GaAs FETs. Furthermore, in some systems, the Tx power leak to the Rx path can still occur even when such a switch is used. With the advent of advanced filter technologies such as Bulk Acoustic Wave (BAW), Surface Acoustic Wave (SAW) or Film Bulk Acoustic Resonator (FBAR) filter technology, Rx BPF technology tends to increase the maximum ratings for input power. These filters can provide resilience to the Tx power leak as well as steep and high rejection characteristics. However, these filters are often fabricated based on a costly platform, for example, Low Temperature Co-fired Ceramic (LTCC) technology. Furthermore, the steep and high rejection characteristics of these filters often provide high insertion loss, giving rise to worsened power transmission in the pass band.

In addition to the isolation consideration, the practical implementation of RF communication systems involves matching of different impedances of coupled blocks to achieve a proper transfer of signal and power. Such implementation tasks include the matching from an antenna to an LNA input, as well as from a PA output to an antenna. The 50 Ω matching is employed for a typical communication system, whereby matching networks may be provided inside or outside the LNA, as well as inside or outside the PA. Note, however, that LNAs or PAs generally have low efficiency in the proximity of 50 Ω: in today's RF amplifier technologies, LNAs have optimum efficiency at high impedance, e.g., ~200 Ω, and PAs have optimum efficiency at low impedance, e.g. ~5 Ω.

A multi-feed antenna that can be coupled to two or more paths may be configured to provide isolation among the paths by providing the physical separation of the paths as well as optimizing impedance matching for each path. Examples and implementations of multi-feed antennas are summarized below.

Figure 3:
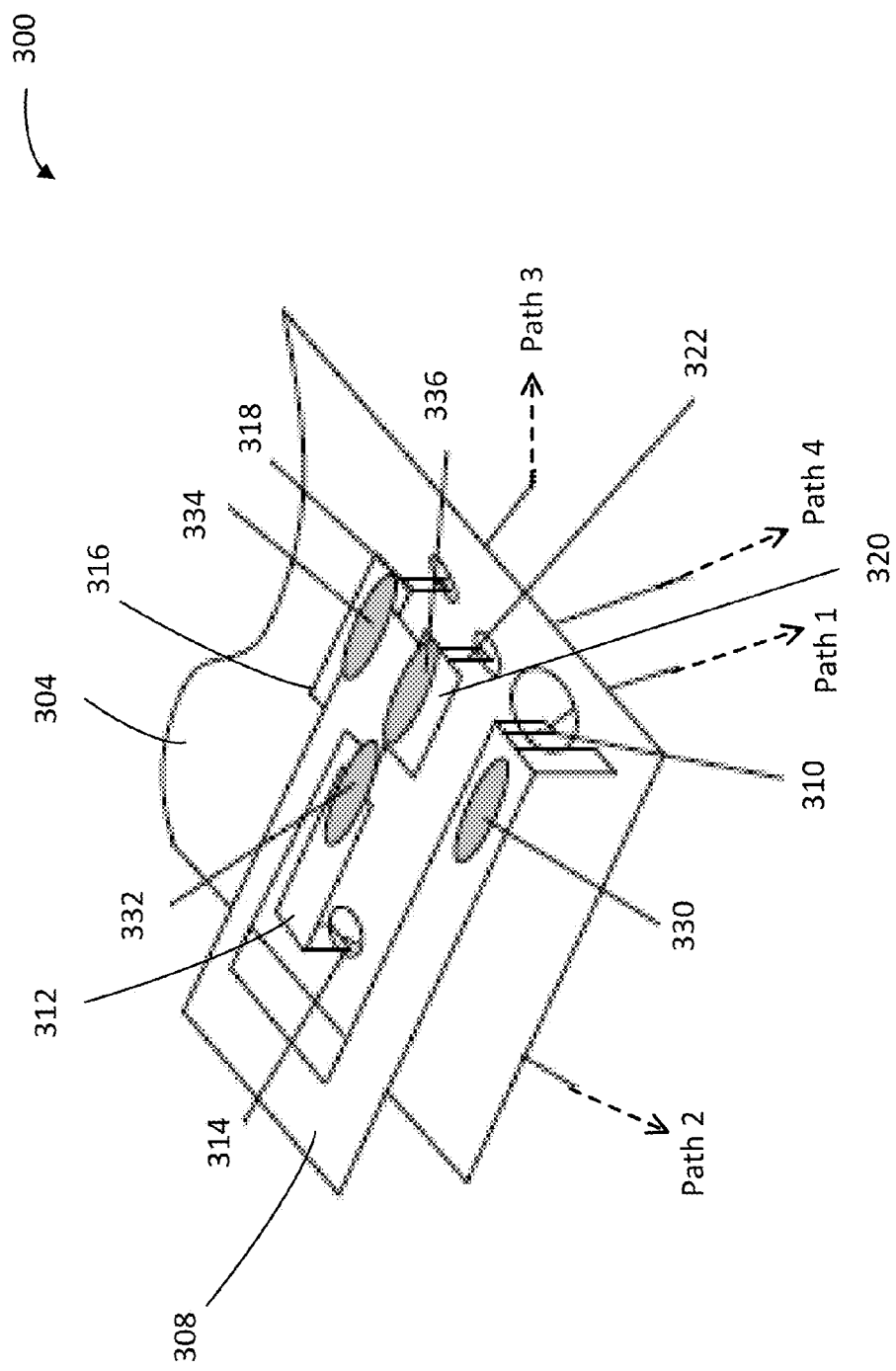
FIG. 3 illustrates an example of an antenna structure used to configure the multi-feed antenna.

FIG. 3 illustrates an example of an antenna structure used to configure the multi-feed antenna. The antenna structure 300 includes a ground plane 304, an isolated magnetic dipole (IMD) radiating element 308 providing a first feed port 310, a second element 312 providing a second feed port 314, a third element 316 providing a third feed port 318, and a fourth element 320 providing a fourth feed port 322. These elements 308, 312, 316 and 320 are coupled to the ground plane 304.

The feed ports 310, 314, 318 and 322 are configured to couple to multiple paths, i.e., path 1, path 2, path 3 and path 4, respectively, corresponding to four different mode/band combinations in the communication system, thereby providing physical separation of the paths. The structure 300 in this example further includes active components 330, 332, 334 and 336, coupled to the feed ports 310, 314, 318 and 322, respectively, allowing for frequency response optimization for each band carried by the corresponding path. In place of or in addition to the active components 330, 332, 334 and 336, an antenna tuning module may be coupled to each feed port. The antenna tuning module may include active as well as passive components that can be configured to optimize the frequency response and/or the impedance matching for each path. Thus, the isolation may be further improved due to the impedance matching individually configured for the separate paths, in addition to the isolation provided by the physical separation of the paths realized by the multiple feeds of the antenna structure 300.

Figure 4:
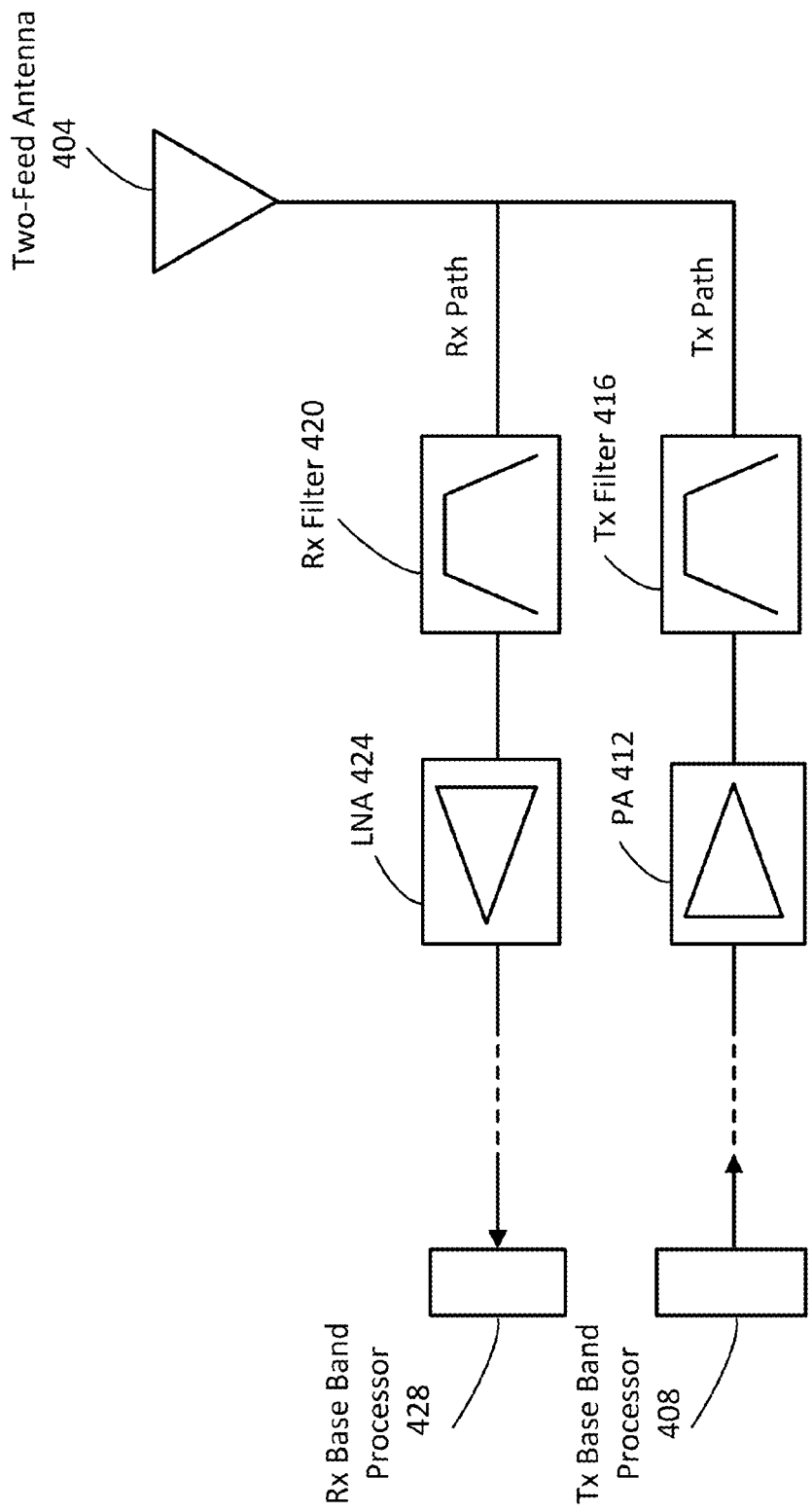
FIG. 4 illustrates an example of an architecture configured for a communication system by using a two-feed antenna coupled to Tx and Rx paths.

FIG. 4 illustrates an example of an architecture configured for a communication system by using a two-feed antenna 404 coupled to Tx and Rx paths. Tx signals in the Tx band are inputted from a Tx base band processor 408, amplified by a PA 412, filtered by a Tx filter 416, and transmitted out from the two-feed antenna 404. Rx signals in the Rx band are received by the two-feed antenna 404, filtered by an Rx filter 420, amplified by an LNA 424, and outputted into an Rx base band processor 428. The Tx filter 416 and the Rx filter 420 may be combined in a duplexer package. As in the RF front end circuit 100 in the example of FIG. 1, other components and modules may be included for signal processing between the two-feed antenna 404 and the base band processors 408 and 428. The components and modules in the system may be controlled by a controller through control lines. A bidirectional control can be realized, for example, by using an interface specified by the MIPI Alliance or GPIOs. See, for example, a white paper entitled "Tuning Technology: Key Element to Lower Operating Costs While Improving Wireless Network Performance," released on Feb. 8, 2011, by IWPC (International Wireless Industry Consortium). The control lines may include a conventional bus, wirelessly-connected transmission or other suitable forms.

The two-feed antenna 404 may be configured to optimize the frequency response for the Tx band and the Rx band and to match the impedances for the Tx and Rx paths, respectively, by using, for example, the antenna tuning module mentioned earlier. The physical separation of the paths may eliminate the need for a switch module such as the switchplexer 118 in the conventional system of FIG. 1. A conventional antenna is typically designed to match to ~50Ω, giving rise to the need for designing and including matching networks between the antenna and the components in the system. However, the multi-feed antenna can be configured to match to different impedances for different paths. For example, the two-feed antenna 404 may be configured to provide ~5 Ω matching for the Tx path, where the PA 412 may work with the optimum efficiency, while providing ~200 Ω matching for the Rx path, where the LNA 424 may work with the optimum efficiency. Thus, the system configured by using the multi-feed antenna may allow for overall efficiency higher than and component count lower than a conventional system, due to the impedance matching individually configured for the separate paths. Further, the isolation can be increased not only by the physical separation of the paths but also by the impedance matching individually configured for the separate paths. The increased isolation provided by the multi-feed antenna may allow for relaxation of the rejection consideration imposed on the filters 416 and 420, duplexers and other components. For example, referencing back to FIG. 2, the 50 dB rejection considered in some applications may be reduced to 30 dB rejection owing to the isolation provided by the impedance matched, separated paths realized by the multiple feeds of the antenna. Accordingly, costly filter or duplexer fabrications for achieving the steep and high rejection characteristics may be avoided, and thus inexpensive filters and/or duplexers may be used since a certain isolation level is already provided by the multi-feed antenna. Furthermore, relaxing the steep and high rejection characteristics of a filter or a duplexer may lead to low insertion loss, giving rise to better power transmission in the pass band.

Figure 5:
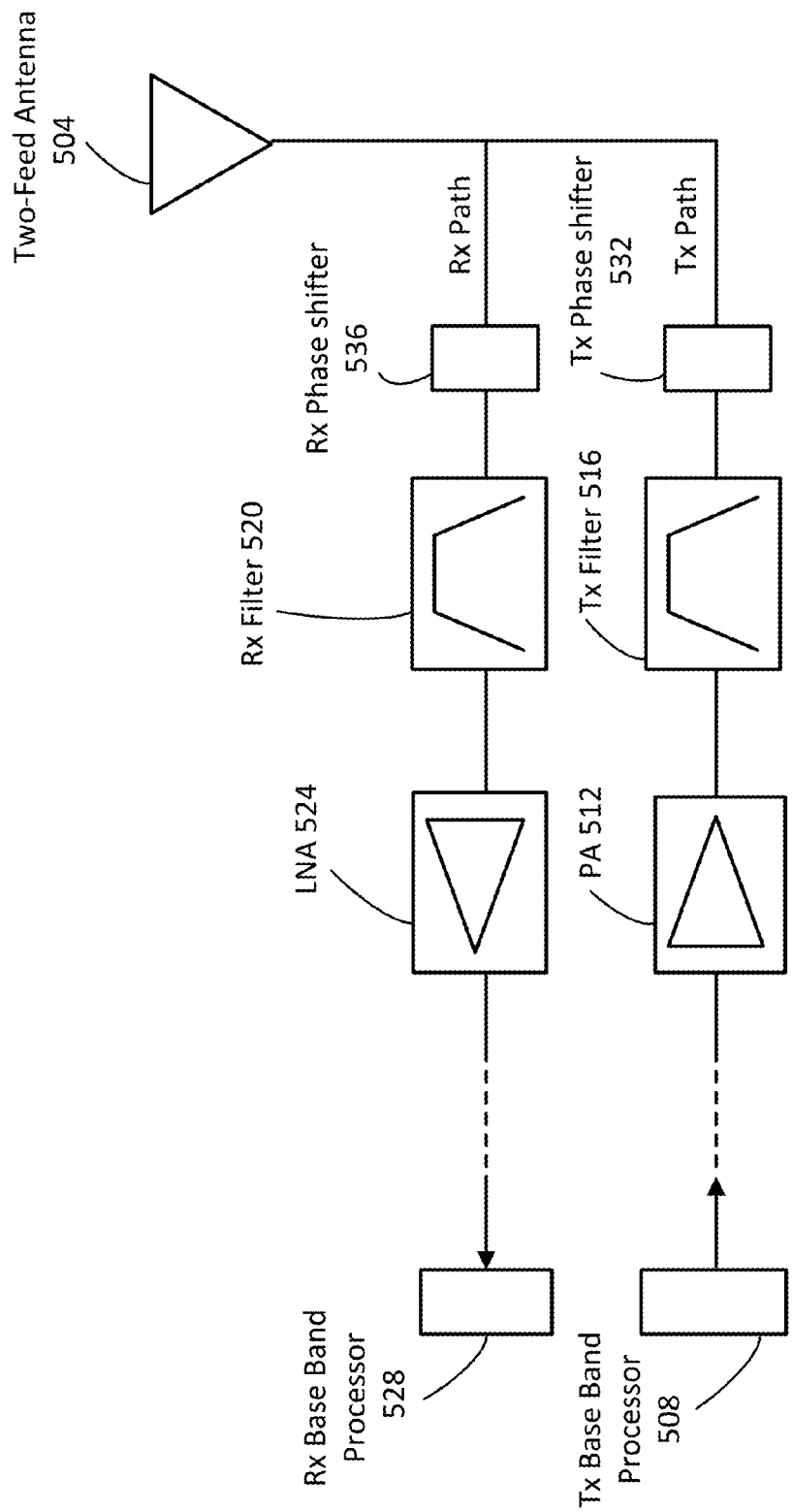
FIG. 5 illustrates another example of an architecture configured for a communication system by using a two-feed antenna coupled to Tx and Rx paths.

FIG. 5 illustrates another example of an architecture configured for a communication system by using a two-feed antenna 504 coupled to Tx and Rx paths. The two-feed antenna 504 may be configured to optimize the frequency response for the Tx band and the Rx band and to match the impedances for the Tx and Rx paths, respectively. This architecture is similar to the architecture of FIG. 4, except that a Tx phase shifter 532 and an Rx phase shifter 536 are added in the Tx and Rx path, respectively. These phase shifters may be configured to be included in the two-feed antenna 504 as part of the antenna tuning module mentioned earlier, for example. Each of the phase shifters 532 and 536 may be configured to adjust signal phases to improve the impedance matching by adjusting the complex part of the impedance, thereby further increasing the isolation. Specifically, in this example, the Tx signals in the Tx band are inputted from a Tx base band processor 508, amplified by a PA 512, filtered by a Tx filter 516, and the phase is adjusted by the Tx phase shifter 532 before being transmitted out from the two-feed antenna 504. Rx signals in the Rx band are received by the two-feed antenna 504, provided with the phase adjustment by the Rx phase shifter 536, filtered by an Rx filter 520, amplified by an LNA 524, and outputted into an Rx base band processor 528. The Tx filter 516 and the Rx filter 520 may be combined in a duplexer package. As in the RF front end circuit 100 in the example of FIG. 1, other components and modules may be included for signal processing between the two-feed antenna 504 and the base band processors 508 and 528. The components and modules in the system may be configured to be controlled by a controller through control lines.

Figure 6:
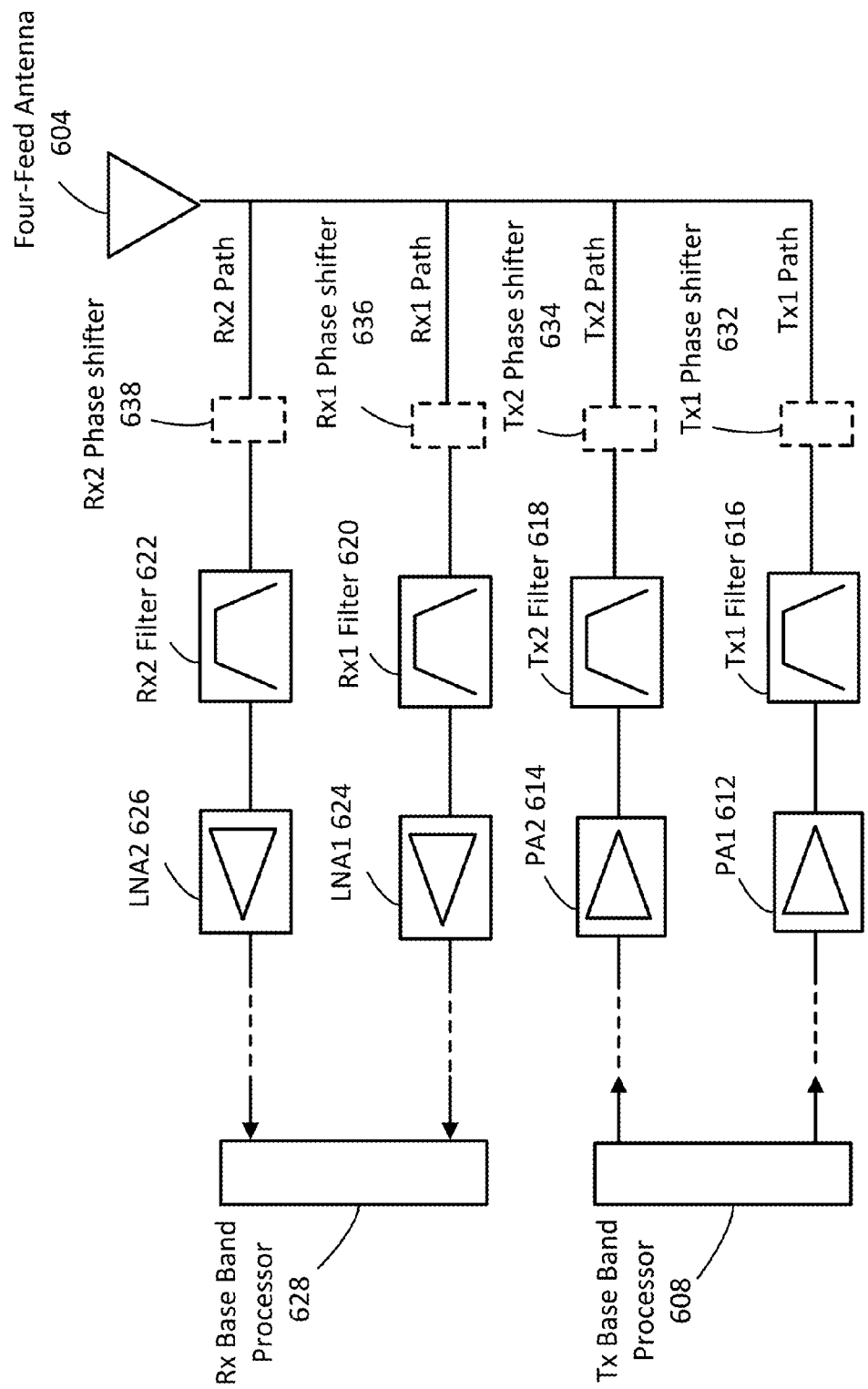
FIG. 6 illustrates yet another example of an architecture configured for a communication system by using a four-feed antenna coupled to two Tx paths and two Rx paths.

FIG. 6 illustrates yet another example of an architecture configured for a communication system by using a four-feed antenna 604 coupled to two Tx paths, labeled Tx1 path and Tx2 path, and two Rx paths, labeled Rx1 path and Rx2 path. This architecture is similar to the architectures of FIGS. 4 and 5, except that the antenna 604 is configured to have four feeds coupled to four different paths. Phase shifters may optionally be added for respective paths, as indicated by the dashed blocks, labeled Tx1 phase shifter 632, Tx2 phase shifter 634, Rx1 phase shifter 636 and Rx2 phase shifter 638. These phase shifters may be configured to be included in the four-feed antenna 604 as part of the antenna tuning module mentioned earlier, for example. Specifically, in this example, the Tx signals in the Tx1 band and the Tx2 band are inputted from a Tx base band processor 608, amplified by a PA1 612 and a PA2 614, respectively, filtered by a Tx filter 616 and a Tx2 filter 618, respectively, and the phases may be optionally adjusted by the Tx1 phase shifter 632 and the Tx2 phase shifter 634, respectively, before the Tx signals being transmitted out from the four-feed antenna 604. Rx signals in the Rx1 band and the Rx2 band are received by the four-feed antenna 604, optionally provided with the phase adjustment by the Rx1 phase shifter 636 and the Rx2 phase shifter 638, respectively, filtered by an Rx1 filter 620 and an Rx2 filter 622, respectively, amplified by an LNA1 624 and an LNA2 626, respectively, and outputted into an Rx base band processor 628. As in the RF front end circuit 100 in the example of FIG. 1, other components and modules may be included for signal processing between the four-feed antenna 604 and the base band processors 608 and 628. The components and modules in the system may be configured to be controlled by a controller through control lines.

The four-feed antenna 604 may be configured to optimize the frequency response for the Tx1, Tx2, Rx1 and Rx2 bands and to match the impedances for the Tx1, Tx2, Rx1 and Rx2 paths, respectively, by using, for example, the antenna tuning module mentioned earlier. The four-feed antenna 604 in this example is configured to have four feeds to optimize the frequency response and impedance matching for two separate paths for the signal transmit in the two Tx bands, respectively, and another two separate paths for the signal receive in the two Rx bands, respectively. However, the multi-feed antenna may be configured to couple to two, three, four or more separate paths with any combination of numbers of Tx and Rx paths; for example, a four-feed antenna may be configured to couple to one Tx path and three Rx paths, a six-feed antenna may be configured to couple to three Tx paths and three Rx paths or two Tx paths and four Rx paths, and so on. The multi-feed antenna may be configured for simultaneous processing of signals, for example, in the FDD scheme. Thus, the system configuration including the multi-feed antenna coupled to separate paths for respective mode/band combinations, such as the example of FIG. 6, may allow for simultaneous processing of voice and data, for example.

Figure 7:
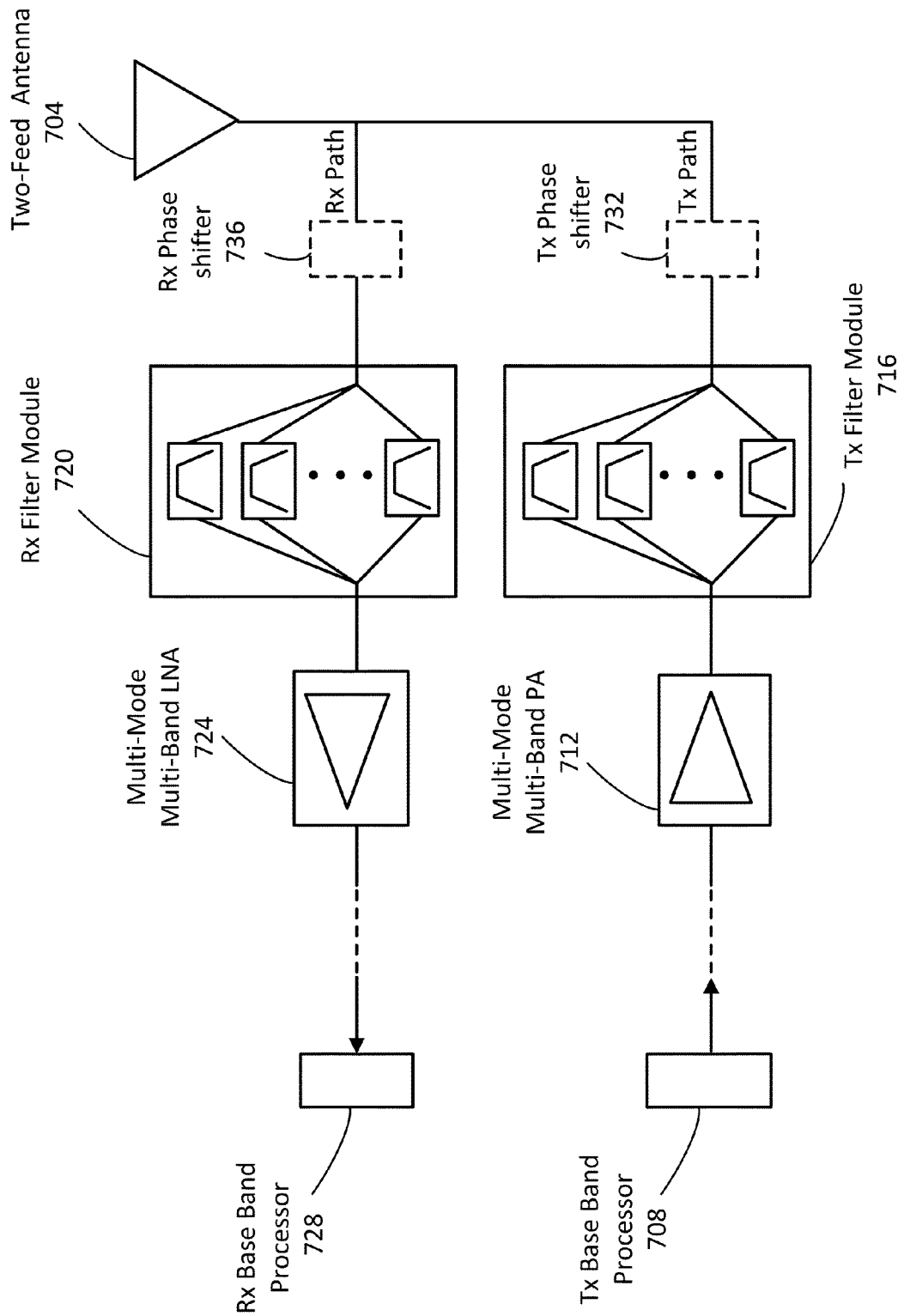
FIG. 7 illustrates yet another example of an architecture configured for a communication system by using a two-feed antenna coupled to a Tx path and an Rx path.

FIG. 7 illustrates yet another example of an architecture configured for a communication system by using a two-feed multi-mode multi-band antenna 704 coupled to a Tx path and an Rx path. The two-feed antenna 704 may be configured to optimize the frequency response for each of multiple Tx bands and multiple Rx bands and to match the impedances for the Tx and Rx paths. Specifically, the antenna 704 may be configured to transmit signals in the multiple Tx bands in different time intervals, and the signals in each of the Tx bands are processed through the Tx path in a time interval. Similarly, the antenna 704 may be configured to receive signals in the multiple Rx bands in different time intervals, and the signals in each of the Rx bands are processed through the Rx path in a time interval. Switching functions may be incorporated in the antenna tuning module of the antenna 704, for example, to select the optimum frequency response corresponding to the mode/band of the signals during the time interval. The impedances for the Tx and Rx paths may be matched to obtain the optimum PA and LNA performances, respectively, e.g., ~5Ω for the Tx path and ~200 Ω for the Rx path, as mentioned earlier. This architecture is similar to the architectures of FIGS. 4 and 5, except that the antenna 704 and other components and modules are adapted for multi-mode multi-band operations and may be controlled by a controller to switch among the multiple mode/band combinations. Thus, the operation mode for this example may include the TDD scheme, for example, where the signals in different mode/band combinations are processed in different time intervals. Accordingly, a multi-mode multi-band PA 712 and a multi-mode multi-band LNA 724 may be adapted for multi-mode multi-band operations in this example. Examples and implementations of multi-mode multi-band PAs are described in the commonly owned U.S. patent application Ser. No. 13/557,173, filed on Jul. 24, 2012, titled "MULTI-MODE MULTI-BAND SELF-REALIGNING POWER AMPLIFIER", the contents of which are hereby incorporated by reference. The example of FIG. 7 includes a Tx filter module 716 that includes multiple filters configured to filter the signals in the Tx path for respective mode/band combinations, and an Rx filter module 720 that includes another multiple filters configured to filter the signals in the Rx path for respective mode/band combinations. Phase shifters may optionally be added for the Tx and Rx paths, as indicated by the dashed blocks. These phase shifters, a Tx phase shifter 732 and an Rx phase shifter 736, may be configured to be adaptive, i.e., capable of adjusting phases dynamically depending on the mode/band combinations of the signals. Furthermore, these adaptive phase shifters may be configured to be included in the two-feed antenna 704 as part of the antenna tuning module mentioned earlier, for example.

Specifically, in this example of FIG. 7, the Tx signals in each of the multiple mode/band combinations are inputted from a Tx base band processor 708 during a time interval, amplified by the multi-mode multi-band PA 712, filtered by the Tx filter module 716, and the phases may be optionally adjusted by the Tx phase shifter 732 before the Tx signals being transmitted out from the two-feed antenna 704. Rx signals in each of the multiple mode/band combinations are received by the two-feed antenna 704 during a time interval, optionally provided with the phase adjustment by the Rx phase shifter 736, filtered by the Rx filter module 720, amplified by the multi-mode multi-band LNA 724, and outputted into an Rx base band processor 728. As in the RF front end circuit 100 in the example of FIG. 1, other components and modules may be included for signal processing between the two-feed antenna 704 and the base band processors 708 and 728.

A controller may be configured to couple to the two-feed antenna 704, the multi-mode multi-band PA 712, the Tx filter module 716, the Rx filter module 720, the multi-mode multi-band LNA 724, and the optionally added Tx and Rx phase shifters 732 and 736 through control lines. Such control connections may be made to other components in the system and/or components inside of a subsystem or a module. As mentioned earlier, a bidirectional control may be realized, for example, by using an interface specified by the MIPI Alliance or GPIOs. See, for example, a white paper entitled "Tuning Technology: Key Element to Lower Operating Costs While Improving Wireless Network Performance," released on Feb. 8, 2011, by IWPC (International Wireless Industry Consortium). The control lines may include a conventional bus, wirelessly-connected transmission or other suitable forms. The controller may be configured to obtain information about the signals from a user selection, a base station and/or other commanding locations or systems. Based on the information the controller may be configured to control the coupled components and modules, for example, by switching each of the two-feed antenna 704, the multi-mode multi-band PA 712, the Tx filter module 716, the Rx filter module 720, the multi-mode multi-band LNA 724, and the optionally added Tx and Rx phase shifters 732 and 736, to select the optimum configuration corresponding to the mode and the band of the signals during the time interval. The incoming signals may vary with time; accordingly, the controller may control these components and modules variably with time to provide the optimum configuration during each time interval.

Figure 8:
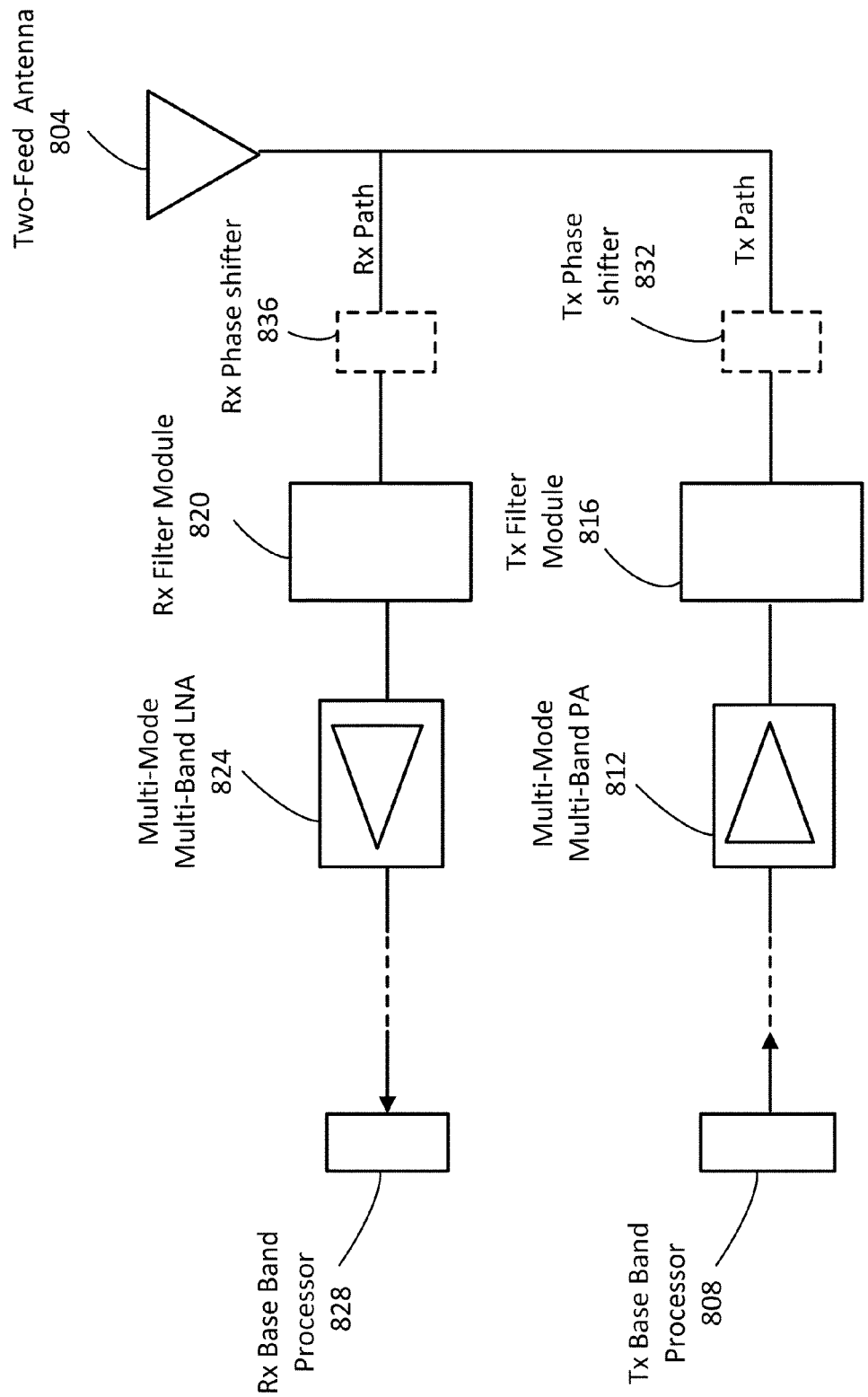
FIG. 8 illustrates yet another example of an architecture configured for a communication system by using a two-feed antenna coupled to a Tx path and an Rx path.

FIG. 8 illustrates yet another example of an architecture configured for a communication system by using a two-feed antenna 804 coupled to a Tx path and an Rx path. Similar to the example of FIG. 7, the antenna 804 and other components and modules in this example of FIG. 8 are adapted for multi-mode multi-band operations and may be controlled by a controller to switch among the multiple mode/band combinations. Thus, the two-feed multi-mode multi-band antenna 804 may be configured to optimize the frequency response for each of the multiple Tx bands and multiple Rx bands and to match the impedances for the Tx and Rx paths, respectively. Each of the Tx and Rx filter modules 716 and 720 in FIG. 7 may be configured to include multiple filters to filter signals in multiple mode/band combinations, respectively, and the switching among the multiple filters may be controlled by a controller. On the other hand, each of the Tx and Rx filter modules 816 and 820 in FIG. 8 may be configured to be adaptive, i.e., capable of dynamically adjusting the filter characteristics depending on the different mode/band combinations of the incoming signals. Such adaptability may be effectuated by using one or more tunable components such as varactors and/or other active elements. Specifically, in this example of FIG. 8, the Tx signals in each of the multiple mode/band combinations are inputted from a Tx base band processor 808 during a time interval, amplified by a multi-mode multi-band PA 812, filtered by the Tx filter module 816, and the phases may be optionally adjusted by a Tx phase shifter 832 before the Tx signals being transmitted out from the two-feed antenna 804. Rx signals in each of the multiple mode/band combinations are received by the two-feed antenna 804 during a time interval, optionally provided with the phase adjustment by an Rx phase shifter 836, filtered by the Rx filter module 820, amplified by a multi-mode multi-band LNA 824, and outputted into an Rx base band processor 828. As in the example of FIG. 7, a controller and associated control lines may be configured to control the coupled multi-mode multi-band components and modules in the example of FIG. 8 by switching each of them to select the optimum configuration corresponding to the mode and the band of the signals during the time interval.

A few implementations are disclosed in the above examples. However, variations, enhancements and/or combinations of the disclosed implementations and other implementations may be made based on what is described and illustrated in these examples. A multi-feed antenna may be configured to couple to a path for a single mode/band combination as well as to a path for multiple mode/band combinations. For example, one or more of the paths coupled to the four-feed antenna in FIG. 6 may be replaced with one or more paths, each for multiple mode/band combinations. In another example, one of the Tx and Rx paths coupled to the two-feed antenna in FIG. 7, each configured for multiple mode/band combinations, may be replaced with a path for a single mode/band combination. In other words, a multi-feed antenna may be configured to couple to two or more paths, each for multiple mode/band combinations, or each for a single mode/band combination, or some for multiple mode/band combinations and the others for a single mode/band combination. In each of these configurations, the multi-feed antenna may be configured to optimize the frequency response for each of the mode/band combinations and the impedance matching for each path.

Figure 9:
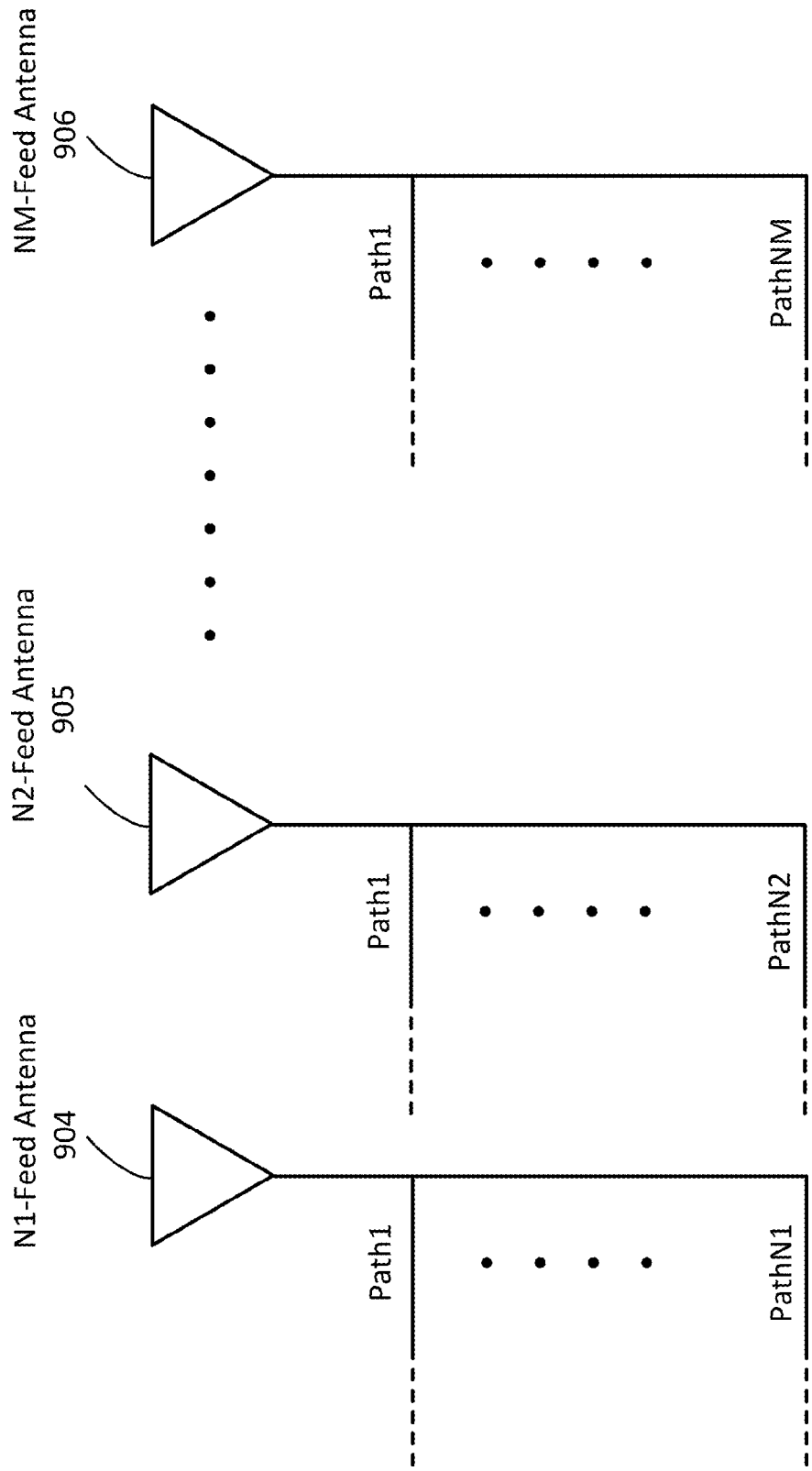
FIG. 9 illustrates an example of an architecture configured for a communication system by using multiple antennas, one or more of which are configured to be multi-feed antennas.

Two or more antennas may be included in a system, for example, for High Speed Packet Access (HSPA), Long Term Evolution (LTE), or other applications. FIG. 9 illustrates an example of an architecture configured for a communication system by using multiple antennas, one or more of which are configured to be multi-feed antennas. Specifically, the system may include a first antenna 904 with N1 feeds, a second antenna 905 with N2 feeds . . . and an M-th antenna 906 with NM feeds, where each of N1, N2, . . . and NM may be greater than or equal to 1. These feeds are configured to couple to respective paths. Although omitted from the figure for simplicity, RF circuits including PAs, LNAs, filters and other components are configured to couple to these antennas. One or more of the antennas may be configured to be multi-feed antennas and the others may be configured to be single-feed antennas; or all of the antennas may be configured to be multi-feed antennas. For example, one of the antennas may be configured to be a four-feed antenna for the EGSM (880-960 MHz) having the Tx band of (880-915 MHz) and the Rx band of (925-960 MHz) and the PCS (1850-1990 MHz) having the Tx band of (1850-1910 MHz) and the Rx band of (1930-1990 MHz). In another example, one single-feed antenna may be used for Rx diversity. In yet another example, two or more antennas may be configured to be multi-feed antennas, having each feed optimized for multiple mode/band combinations or a single mode combination, providing various link possibilities. Such a communication system including one or more multi-feed antennas may thus allow for flexibility in choosing desired links according to the priority a user may have or the country he/she has entered. In each of these configurations, the multi-feed antenna may be configured to optimize the frequency response for each of the mode/band combinations and the impedance matching for each path. In such a communication system with reconfigurable impedances, it is possible to reconfigure different paths for optimized impedances. Thus, the coupling and correlation among antennas may be reduced, thereby improving the isolation.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A communication system comprising:
    a plurality of paths comprising one or more first paths for processing first signals and one or more second paths for processing second signals;
    one or more power amplifiers (PAs) coupled respectively to the one or more first paths for amplifying the first signals;
    one or more low noise amplifiers (LNAs) coupled respectively to the one or more second paths for amplifying the second signals;
    one or more first filter modules coupled respectively to the one or more first paths for filtering the first signals;
    one or more second filter modules coupled respectively to the one or more second paths for filtering the second signals; and
    a multi-feed antenna, the multi-feed antenna comprising:
        a ground plane;
        a radiating element positioned above the ground plane and having a first feed port associated therewith;
        a second element coupled to the ground plane and positioned adjacent to the radiating element, the second element having a second feed port associated therewith;
        a third element coupled to the ground plane and positioned adjacent to at least one of the radiating element and the second element, the third element having a third feed port associated therewith;

each of the first through third feed ports being coupled to one of the plurality of paths, respectively, to provide physical separation of the plurality of paths from each other, the multi-feed antenna being configured to provide impedance matching for each of the plurality of paths, wherein the multi-feed antenna transmits first signals and receives second signals, wherein the physical separation of the plurality of paths and the impedance matching for each of the plurality of paths provide isolation among the plurality of paths, and relax rejection considerations on the one or more first filter modules and the one or more second filter modules.

2. The communication system of claiml, wherein
the impedance matching is configured to optimize efficiency of the one or more PAs and the one or more LNAs.

3. The communication system of claim 1, wherein
the relaxed rejection considerations on the one or more first filter modules and the one or more second filter modules reduces insertion loss.

4. The communication system of claim 1, wherein
the isolation reduces a power leak from one path to another.

5. The communication system of claim 4, wherein
the power leak is from at least one of the one or more first paths to at least one of the one or more second paths when the multi-feed antenna transmits the first signals; and
the rejection considerations on at least one of the one or more second filter modules coupled to the at least one of the one or more second paths are substantially relaxed.

6. The communication system of claim 1, further comprising:
one or more first phase shifters respectively coupled to the one or more first paths; and
one or more second phase shifters respectively coupled to the one or more second paths, wherein
the one or more first phase shifters are configured to adjust phases of the first signals and the one or more second phase shifters are configured to adjust phases of the second signals to improve the impedance matching to increase the isolation.

7. The communication system of claim 6, wherein
at least one of the one or more first phase shifters and the one or more second phase shifters is configured to be part of the multi-feed antenna.

8. The communication system of claim 1, wherein
at least one of the plurality of paths is configured to process signals in a plurality of combinations, each combination being a pair of a mode and a band, during different time intervals; and
the multi-feed antenna is further configured to optimize frequency response for each of the plurality of combinations during the time interval.

9. The communication system of claim 8, wherein
the signals comprise the first signals;
at least one PA respectively coupled to the at least one of the plurality of paths is configured to amplify the first signals in the plurality of combinations during the different time intervals; and
at least one first filter module respectively coupled to the at least one of the plurality of paths is configured to filter the first signals in the plurality of combinations during the different time intervals.

10. The communication system of claim 9, further comprising:
at least one first phase shifter respectively coupled to the at least one of the plurality of paths to adjust phases of the first signals in the plurality of combinations during the different time intervals to improve the impedance matching to increase the isolation.

11. The communication system of claim 10, wherein
the at least one first phase shifter is configured to be part of the multi-feed antenna.

12. The communication system of claim 9, wherein
each of the at least one first filter module comprises a plurality of filters corresponding to the plurality of combinations, respectively, and is configured to select one of the plurality of filters to filter the first signals in a combination during a time interval.

13. The communication system of claim 9, wherein
each of the at least one first filter module comprises one or more selected from a group consisting of tunable components and active elements to adjust filter characteristics depending on the combinations.

14. The communication system of claim 8, wherein
the signals comprise the second signals;
at least one LNA respectively coupled to the at least one of the plurality of paths is configured to amplify the second signals in the plurality of combinations during the different time intervals; and
at least one second filter module respectively coupled to the at least one of the plurality of paths is configured to filter the second signals in the plurality of combinations during the different time intervals.

15. The communication system of claim 14, further comprising:
at least one second phase shifter respectively coupled to the at least one of the plurality of paths to adjust phases of the second signals in the plurality of combinations during the different time intervals to improve the impedance matching to increase the isolation.

16. The communication system of claim 15, wherein
the at least one second phase shifter is configured to be part of the multi-feed.

17. The communication system of claim 14, wherein
each of the at least one second filter module comprises a plurality of filters corresponding to the plurality of combinations, respectively, and is configured to select one of the plurality of filters to filter the second signals in a combination during a time interval.

18. The communication system of claim 14, wherein
each of the at least one second filter module comprises one or more selected from a group consisting of tunable components and active elements to adjust filter characteristics depending on the combinations.

19. The communication system of claim 1, wherein
at least one of the plurality of paths is configured to process signals in at least one combination, respectively, the combination being a pair of a mode and a band; and
the multi-feed antenna is further configured to optimize frequency response for the at least one combination.

20. The communication system of claim 19, wherein
the signals comprise the first signals;
at least one PA respectively coupled to the at least one of the plurality of paths is configured to amplify the first signals in the at least one combination, respectively; and
at least one first filter module respectively coupled to the at least one of the plurality of paths is configured to filter the first signals in the at least one combination, respectively, each of the at least one first filter module comprising a filter corresponding to a combination.

21. The communication system of claim 19, further comprising:
at least one first phase shifter respectively coupled to the at least one of the plurality of paths to adjust phases of the first signals in the at least one combination, respectively, to improve the impedance matching to increase the isolation.

22. The communication system of claim 21, wherein
the at least one first phase shifter is configured to be part of the multi-feed antenna.

23. The communication system of claim 19, wherein
the signals comprise the second signals;
at least one LNA respectively coupled to the at least one of the plurality of paths is configured to amplify the second signals in the at least one combination, respectively; and
at least one second filter module respectively coupled to the at least one of the plurality of paths is configured to filter the second signals in the at least one combination, respectively, each of the at least one second filter module comprising a filter corresponding to a combination.

24. The communication system of claim 23, further comprising:
at least one second phase shifter respectively coupled to the at least one of the plurality of paths to adjust phases of the second signals in the at least one combination, respectively, to improve the impedance matching to increase the isolation.

25. The communication system of claim 24, wherein
the at least one second phase shifter is configured to be part of the multi-feed antenna.

26. A communication system, comprising:
a plurality of antennas including one or more multi-feed antennas, each of the one or more multi-feed antennas including:
a ground plane;
a radiating element positioned above the ground plane and having a first feed port associated therewith; and
at least a second element coupled to the ground plane and positioned adjacent to the radiating element, the second element having a second feed port associated therewith;
each of the feed ports being coupled to one of a plurality of paths, respectively, to provide physical separation of the plurality of paths from each other, and configured to provide impedance matching for each of the plurality of paths, wherein
the physical separation of the plurality of paths and the impedance matching for each of the plurality of paths provide isolation among the plurality of paths, and relax rejection considerations on filters coupled to the plurality of paths.

27. The communication system of claim 26, wherein
the plurality of antennas including the one or more multi-feed antennas are configured to provide multiple communication links to be selected according to a priority that a user has or a country where the user is located.

28. The communication system of claim 26, wherein
the impedance matching is reconfigured to reduce coupling and correlation among the plurality of antennas to improve the isolation.

29. The communication system of claim 26, wherein
the plurality of paths comprise one or more first paths for processing first signals and one or more second paths for processing second signals;
the one or more first paths are coupled respectively to one or more PAs for amplifying the first signals; and
the one or more second paths are coupled respectively to one or more LNAs for amplifying the second signals.

30. The communication system of claim 28, wherein
the impedance matching is configured to optimize efficiency of the one or more PAs and the one or more LNAs.

31. The communication system of claim 26, wherein
the isolation reduces a power leak from one path to another.

32. The communication system of claim 30, wherein
the power leak is from at least one of the one or more first paths to at least one of the one or more second paths when the multi-feed antenna transmits the first signals.

33. The communication system of claim 28, wherein
the one or more first paths are coupled respectively to one or more first phase shifters; and
the one or more second paths are coupled respectively to one or more second phase shifters,
wherein
the one or more first phase shifters are configured to adjust phases of the first signals and the one or more second phase shifters are configured to adjust phases of the second signals to improve the impedance matching to increase the isolation.

34. The communication system of claim 32, wherein
at least one of the one or more first phase shifters and the one or more second phase shifters is configured to be part of the multi-feed antenna.

* * * * *